April 5, 1927.
W. J. PRIESTLEY
1,623,438
AIR HEATER AND MOISTENER FOR CARBURETORS
Filed March 6, 1926
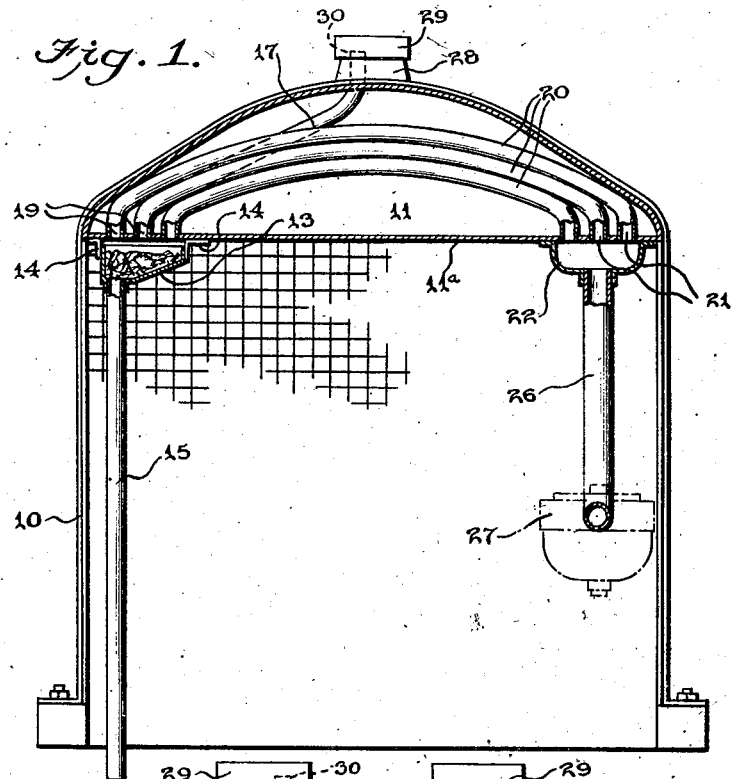
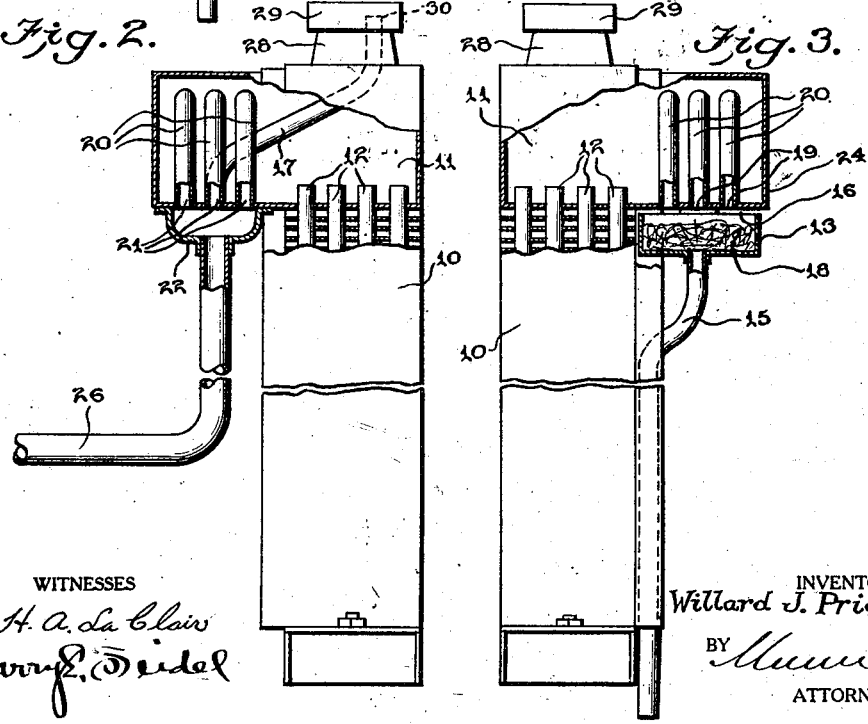
INVENTOR
Willard J. Priestley
BY
ATTORNEYS
WITNESSES Patented Apr. 5, 1927.

1,623,438

UNITED STATES PATENT OFFICE.

WILLARD J. PRIESTLEY, OF SOUTH SIOUX CITY, NEBRASKA.

AIR HEATER AND MOISTENER FOR CARBURETORS.

Application filed March 6, 1926. Serial No. 92,898.

This invention relates to a device for heating and moistening air delivered to carburetors.

It is well known that in the production of fuel vapors composed of a mixture of vaporized liquid fuel and air that a great deal of refrigeration is produced in the carburetor and intake manifold which tends to cause globules of liquid fuel being carried into the engine and thereby reducing the power of the engine. It has been attempted to overcome such conditions by supplying dry warm air to the carburetor or by using all forms of air stoves for heating either the air, fuel or the vapors either before the fuel and air reaches the carburetor, in the carburetor or by heating the intake manifold. The result is that the charge is not only greatly overheated but the air has been expanded too much so that the fuel is not effective to produce the proper results during all operating conditions of the engine since the engine becomes overheated during heavy duty and much of the heat which should ordinarily have been dissipated from the engine is employed through the charge to increase the overheating.

An object of the present invention is the provision of a device for associating with the radiator of an automobile for not only heating the air employed in the carburetor to a predetermined degree but for moistening the air in order in the first place to prevent the usual refrigeration at the intake and for supplying sufficient moisture to aid in maintaining the proper temperature of the firing chamber of the engine cylinders and thereby prevent preignition and decrease the carbon deposit in the cylinders of the motor.

A further object of the invention is the provision of a device adapted to be employed in a radiator of an automobile and connected with the air conduit to the carburetor for supplying warm air to the carburetor and for aiding in cooling the water in the radiator, the device including an air chamber provided with a pad or other form of moistener which is constantly saturated by reason of its connection with the overflow pipe of the radiator so that as the air passes thru the moistened pad and through the hottest portion of the radiator it will be warmed and be supplied consequently with a predetermined quantity of moisture to the mixing chamber of the carburetor.

A still further object of the invention is the provision of a device adapted to be placed in the radiator of an automobile and connected with the air conduit of the carburetor for supplying warm moist air to said carburetor and includes a conically shaped chamber mounted in the upper header of the radiator with the lower end of the chamber being connected to the overflow pipe of the radiator, the upper end of the chamber being connected to a plurality of tubes with a closed chamber also located in the upper header and a pipe connecting the closed chamber with the carburetor.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a transverse vertical section taken through the rear end of the radiator.

Figure 2 is a vertical section taken through the air chamber.

Figure 3 is a vertical section taken through the air moistener connected to the radiator.

Referring more particularly to the drawings, 10 designates a radiator having an upper header 11 into which the radiator tubes 12 extend. A cup-shaped container 13 is secured in spaced relation to the under face of the bottom 11$^a$ of the upper header 11 by straps 14 and is reduced at its lower end and connected with an overflow pipe 15 which extends downwardly and terminates adjacent the bottom of the radiator. The spacing of the member 13 from the bottom 11$^a$ provides an air space 16 or passage for the air at the rear of the radiator to the cup-shaped member 13.

A sponge or pad 18 of any suitable material is located in the cup 13 and is adapted to be moistened by the water which overflows from the header 11. The excess water from a predetermined level in the header 11 passes through a pipe 17 to cup 13 and then to the pipe 15 to the atmosphere below the radiator. The bottom plate 11$^a$ is provided with a plurality of perforations 19 and a plurality of pipes 20 are connected with the bottom plate and alining with the perforations and are extended across and through the header 11 and are connected to said bottom plate above an air chamber 22 which is likewise sealed at its upper end to the under face of the bottom plate of the header 11. The plate 11ª at this point is provided with a plurality of perforations 21 alining with the pipes 20. The air chamber 22 and the cup-shaped member 13 are located at the rear of the header and in an extension 24 of said header.

A pipe 26 connected with the lower reduced end of the chamber 22 is extended and connected with a carburetor 27 for supplying the carburetor with warm moist air. The radiator is provided with the usual filling nozzle 28 and a closure cap 29.

The operation of my device is as follows:

Water is poured into the radiator until the level reaches the upper end 30 of the pipe 17 whence the water will overflow and saturate the pad 18 and be discharged through the overflow pipe 15. At this time the filling of the radiator is complete. When the engine is operating air will be drawn through passage 16 above the surface of the moistened sponge 18 then through the pipes 20 which are located at the hottest part of the radiator thereby heating the air which is then carried through the air chamber 22 through pipe 26 and to the carburetor 27 and cooling the water in said header. The temperature of the water is normally sufficient to heat the air to the desired degree and sufficient moisture is supplied to the sponge 18 at all times to aid in adding the proper quantity of water vapor to the air for the best needs of the engine.

It will be appreciated that as the air is drawn through the pipes 20 which are located in the header 11 that the continuous passage of air during the operation of the engine will tend to maintain the water in said header at a predetermined temperature so that the radiator will thereby be cooled so that the air intake provides a double function for not only heating and moistening the air delivered to the carburetor but the additional cooling means is provided for the water in the raidator.

What I claim is:

1. A device of the character described comprising in combination, a radiator provided with an upper header, an air moistening compartment located below the upper header and connected with the usual overflow pipe of said radiator, an air chamber sealed to the bottom of the header, a plurality of tubes connecting the air moistener with the air chamber, said air moistener being provided with a passage for the admission of air to the air moistener, a carburetor, and a tube connecting the air chamber with the carburetor.

2. A device of the class described, in combination with a radiator having an upper header, the header having a bottom plate, a cup-shaped air moistener mounted below the header, the plate provided with a plurality of perforations above the cup-shaped member, means for securing the cup-shaped member adjacent its upper edge, an air chamber sealed to the bottom plate of the header, a carburetor, the lower end of the air chamber being connected with the carburetor, the bottom plate being provided with a plurality of perforations above the air chamber, and tubes located in the header and connecting the perforations in the plate above the air moistener with the perforations in the bottom plate above the air chamber.

3. A device of the class described in combination with a radiator having an upper header, the header being provided with a bottom plate, a casing secured to the under face of the bottom plate and spaced therefrom to provide an air passage, a sponge located in the casing, the bottom plate being provided with a pair of series of perforations at opposite ends of the plate, one of the series being located above the casing, a pipe extending from one of said perforations to a point adjacent the top of the radiator for supplying water to the sponge, the series of perforations being connected by tubes passing through the header, an air chamber located externally of the header and secured to the under face of the bottom plate below the second series of perforations, the second series of perforations being in communication with the air chamber, a conduit in open communication with the air chamber adapted to be connected with the carburetor, and a discharge conduit connected with the casing forming the air moistener.

4. A device of the character described comprising in combination a radiator, an air moistening compartment connected externally to the radiator, an overflow pipe connected with the air moistening compartment, an air chamber carried by the opposite end of the radiator, a plurality of tubes connecting the air moistener with the air chamber, a conduit in communication with the air chamber for connection with a carburetor, said air moistener being provided with an opening for the admission of air thereto.

WILLARD J. PRIESTLEY.